US011102242B2

(12) United States Patent
Lv

(10) Patent No.: US 11,102,242 B2
(45) Date of Patent: *Aug. 24, 2021

(54) ANTI-REPLAY DEVICE BASED ON MEMORY SPACE INTERCHANGE

(71) Applicant: Advanced New Technologies Co., Ltd., George Town (KY)

(72) Inventor: Hong Lv, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/035,539

(22) Filed: Sep. 28, 2020

(65) Prior Publication Data

US 2021/0014268 A1  Jan. 14, 2021

Related U.S. Application Data

(63) Continuation of application No. 16/713,409, filed on Dec. 13, 2019, now Pat. No. 10,791,143, which is a
(Continued)

(51) Int. Cl.
*H04L 29/00* (2006.01)
*H04L 29/06* (2006.01)

(52) U.S. Cl.
CPC ........ *H04L 63/1466* (2013.01); *H04L 63/123* (2013.01); *H04L 63/1416* (2013.01)

(58) Field of Classification Search
CPC ............... H04L 63/1466; H04L 63/123; H04L 63/1416; H04L 9/0643; H04L 9/0637;
(Continued)

(56) References Cited

U.S. PATENT DOCUMENTS

2017/0149819 A1  5/2017 Androulaki et al.
2018/0060607 A1* 3/2018 Tasher .................. G06F 21/602
(Continued)

FOREIGN PATENT DOCUMENTS

CN       106991607       7/2017
CN       108805569       11/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Don G Zhao
(74) *Attorney, Agent, or Firm* — Fish & Richardson P.C.

(57) ABSTRACT

Disclosed herein are methods, systems, and apparatus, including computer programs encoded on computer storage media, for detecting and disabling replay attacks. One of the methods includes receiving a transaction to be completed in a blockchain. A current working section of memory storing transaction information that is designated for use in identifying past transactions already processed is determined, where the memory also stores a backup section providing, when used in combination with the current working section, an alternating memory section storage scheme for the transaction information. From the current working section, whether the transaction has previously been processed is determined. When it is determined that the transaction has previously been processed, the transaction is bypassed. When it is determined that the transaction has not previously been processed the transaction is processed and transaction information for the transaction is written into the current working section.

15 Claims, 7 Drawing Sheets

Related U.S. Application Data continuation of application No. PCT/CN2019/093085, filed on Jun. 26, 2019.

(58) Field of Classification Search
CPC ... H04L 2209/38; G06F 16/955; G06F 16/953
See application file for complete search history.

(56) References Cited

U.S. PATENT DOCUMENTS

| | | | |
|---|---|---|---|
| 2018/0078843 A1* | 3/2018 | Tran | A61B 5/0024 |
| 2018/0117446 A1* | 5/2018 | Tran | G06Q 20/389 |
| 2018/0131716 A1* | 5/2018 | Chantz | H04L 63/1441 |
| 2018/0300729 A1* | 10/2018 | Siddens | G06Q 20/4016 |
| 2019/0020661 A1* | 1/2019 | Zhang | H04L 9/3242 |
| 2019/0035018 A1* | 1/2019 | Nolan | G06Q 20/36 |
| 2019/0079998 A1* | 3/2019 | Rush | H04L 9/0643 |
| 2019/0095879 A1* | 3/2019 | Eyal | G06Q 20/06 |
| 2019/0124146 A1* | 4/2019 | Austin | H04L 9/0643 |
| 2019/0188089 A1* | 6/2019 | Mueller | G06F 11/1464 |
| 2019/0197574 A1* | 6/2019 | Berman | G06Q 20/3224 |
| 2019/0273617 A1* | 9/2019 | Maher | H04L 9/3242 |
| 2019/0312855 A1* | 10/2019 | Sharma | H04L 67/10 |
| 2019/0320014 A1* | 10/2019 | Allen | H04L 67/18 |
| 2019/0361917 A1* | 11/2019 | Tran | G06Q 40/04 |
| 2019/0391973 A1* | 12/2019 | Qiu | H04L 63/126 |
| 2020/0007311 A1* | 1/2020 | Oberhofer | H04L 63/08 |
| 2020/0007342 A1* | 1/2020 | Liem | H04L 9/0637 |
| 2020/0034448 A1* | 1/2020 | Sato | G06Q 20/223 |
| 2020/0034453 A1* | 1/2020 | Sato | G06F 21/602 |
| 2020/0034456 A1* | 1/2020 | Montgomery-Recht | H04L 9/3242 |
| 2020/0034469 A1* | 1/2020 | Sato | G06F 16/1834 |

FOREIGN PATENT DOCUMENTS

| | | |
|---|---|---|
| CN | 108881120 | 11/2018 |
| CN | 109584063 | 4/2019 |
| TW | 201924278 | 6/2019 |
| WO | WO 2019072312 | 4/2019 |
| WO | WO 2019072314 | 4/2019 |

OTHER PUBLICATIONS

Extended European Search Report in European Application No. 19764325.7, dated Aug. 6, 2020, 7 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/093085, dated Mar. 26, 2020, 9 pages.

* cited by examiner

ANTI-REPLAY DEVICE BASED ON MEMORY SPACE INTERCHANGE

CROSS-REFERENCE TO RELATED APPLICATIONS

This application is a continuation U.S. application Ser. No. 16/713,409, filed on Dec. 13, 2019 which is a continuation of PCT Application No. PCT/CN2019/093085, filed on Jun. 26, 2019, and each application is hereby incorporated by reference in its entirety.

TECHNICAL FIELD

This specification relates to identifying replay attacks (or playback attacks) in which a transaction or transmission is maliciously or fraudulently repeated.

BACKGROUND

Distributed ledger systems (DLSs), which can also be referred to as consensus networks, and/or blockchain networks, enable participating entities to store data securely and immutably. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Replay attacks can refer to situations in which an attacker sends a packet, such as a transaction in a blockchain network, that a destination host has already received. The purpose of a replay attack is to deceive the blockchain network. The replay attack can be performed by an initiator, such as a malicious computer user, that intercepts (for example, by eavesdropping) the transaction and resends data associated with the transaction. The reply attack can happen in any network communication process and is one of the most common attack methods used by malicious computer users.

A Bloom filter can be used to identify whether a transaction is already present. The Bloom filter is a data structure that is optimized for efficient insertion and query and that can accept queries such as "something (transaction) must not exist, or may be it does" and return a probabilistic value. The Bloom filter has an advantage of being more efficient and consuming less computing resources (for example, memory space) than other traditional data structures (for example, lists, sets, and maps). A disadvantage of the Bloom filter is that the return value is probabilistic (that is, not exact).

It would be desirable to speed up the process of identifying duplicate transaction in order to more quickly identify replay attacks.

SUMMARY

This specification describes technologies for identifying replay attacks using a memory space interchange. These technologies generally involve storing transaction information (for example, transaction identifiers (IDs)). Memory for storing transaction information can be divided into a working section and a backup section. The working section can be used to store current transaction information. Once the working section is nearly full, transactions can be stored in the backup section. During an overlapping period, transaction information can be stored in both of the working section and the backup section, providing redundancy. At a switch-over time, the backup section can be designated as the new working section in which transaction information is written. Storing and searching on transaction information for only the most recent transactions can speed up search time.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
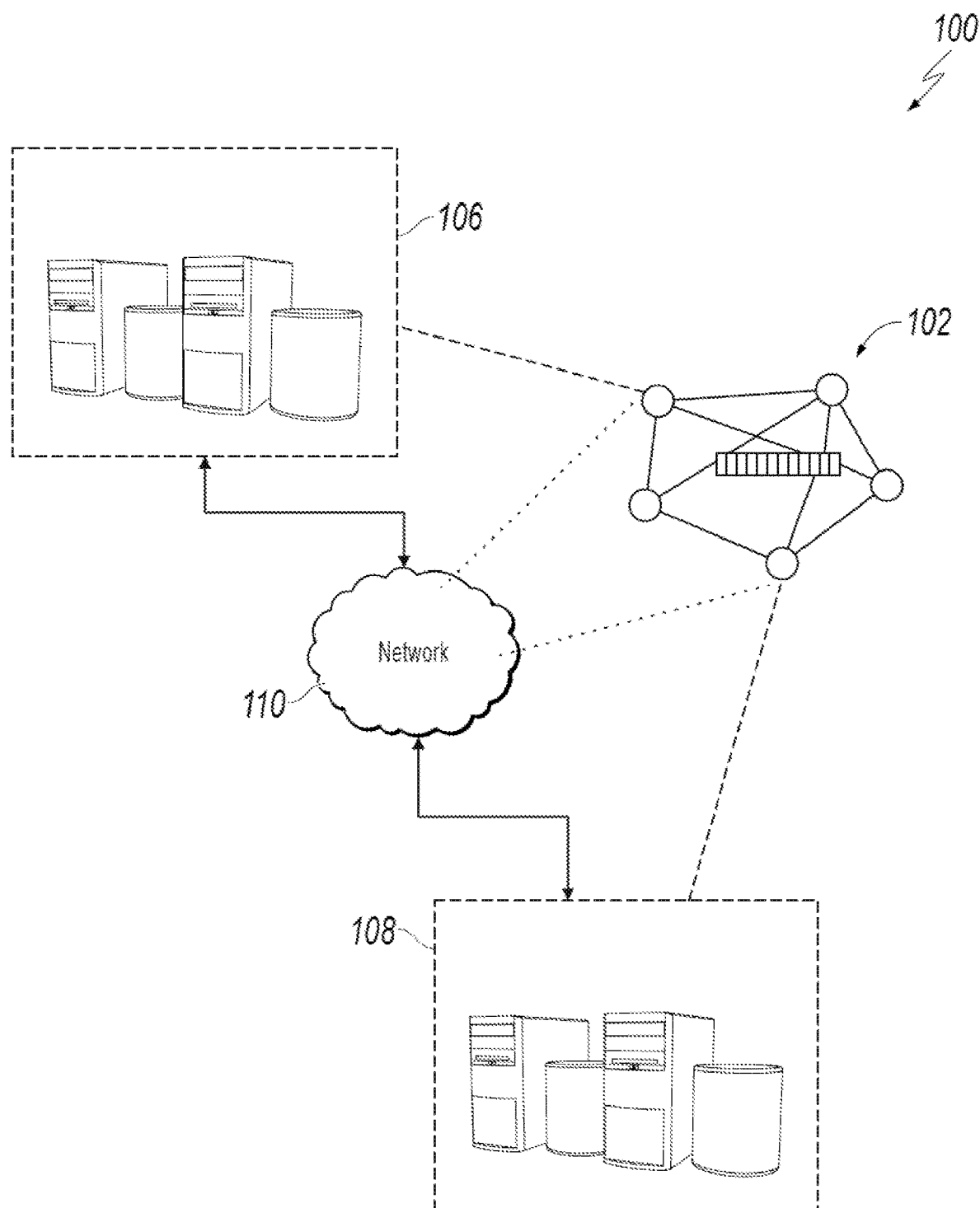
FIG. 1 is a diagram illustrating an example of an environment that can be used to execute embodiments of this specification.

The present disclosure describes techniques for technologies for using a memory space interchange for more efficiently identifying replay attacks. Information for only the most recent transactions are stored in a working section of memory. A switch-over is performed upon determination of a threshold condition, such as when the working section is at a threshold percentage of being full. During a switch-over, the backup section becomes the working section. During an overlapping period, transaction information can be stored in both of the working section and the backup section, providing redundancy. Storing and searching on transaction information for only the most recent transactions can speed up search times. The transactions can be transactions in a blockchain, for example.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
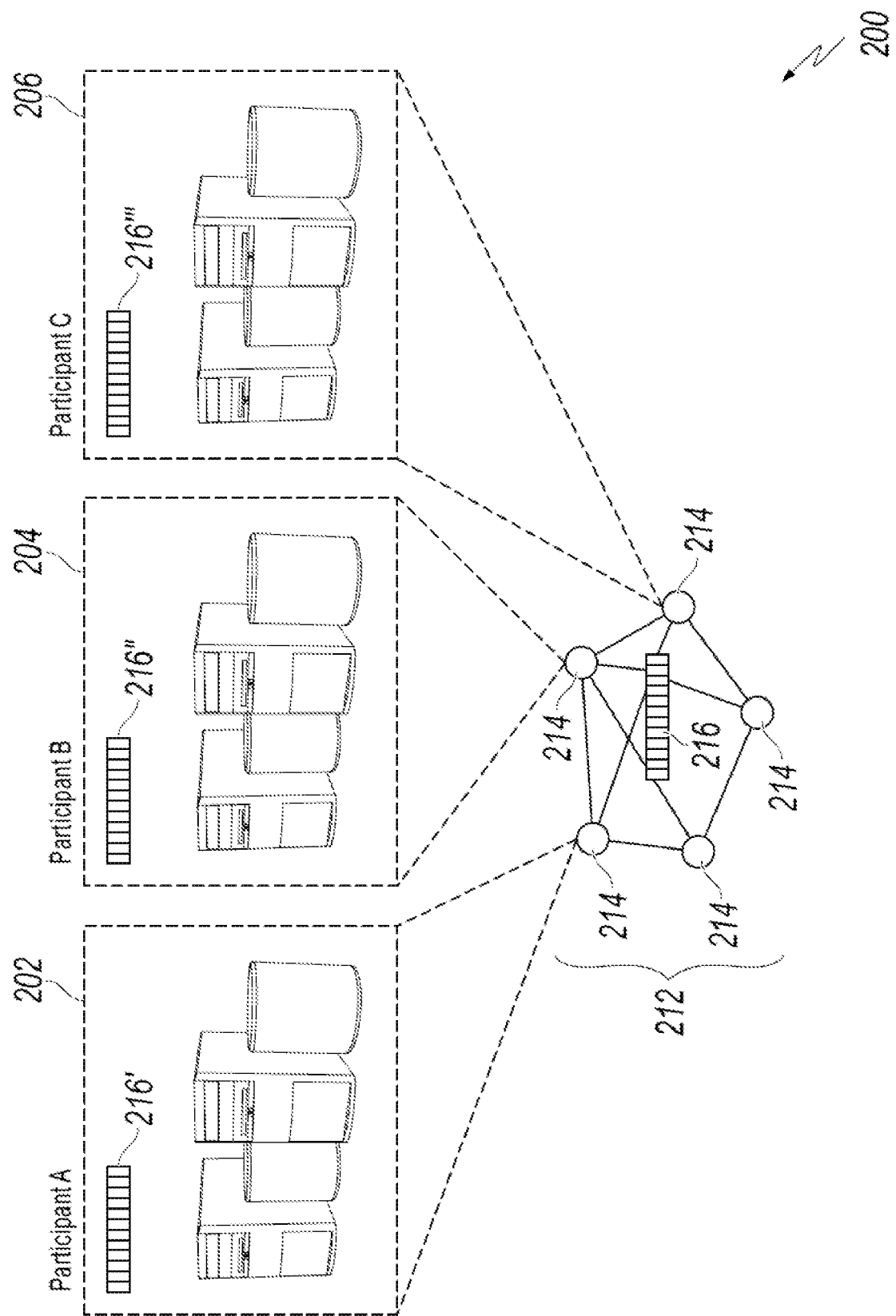
FIG. 2 depicts an example of an architecture in accordance with embodiments of this specification.

FIG. 2 depicts an example of a conceptual architecture 200 in accordance with implementations of the present specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216", 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some cases, a blockchain can be attacked by a malicious agent. For example, a malicious agent, such as a software bot (also known as, for example, an Internet bot, a web robot, WWW robot, or bot), can initiate a replay attack on the blockchain. The replay attack can attempt to cause a transaction in the blockchain to be re-processed, which can cause, among other issues, a waste of computing resources (such as, processing speed, network bandwidth, memory usage, and data storage usage) or loss of property (for example, an amount of currency).

Figure 3:
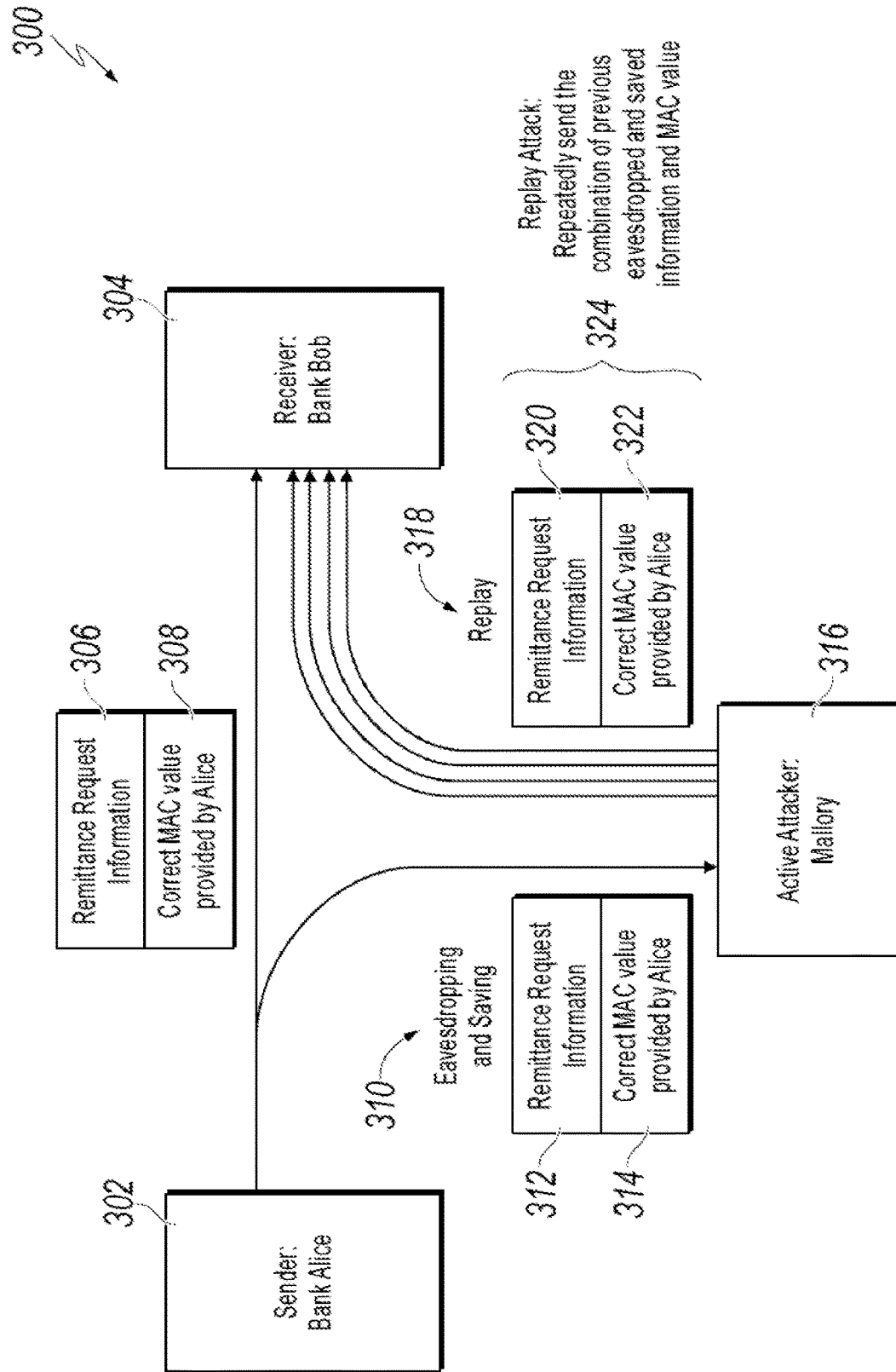
FIG. 3 is a block diagram showing an example of a replay attack scenario in accordance with embodiments of this specification.

FIG. 3 is a block diagram showing an example of a replay attack scenario 300 in accordance with embodiments of this specification. The replay attack scenario 300 includes a replay attack that includes replaying a transaction intended to occur once between a sender bank Alice 302 and a receiver bank Bob 304. The transaction includes remittance request information 306 and a correct MAC value 308 provided by Alice 302. During the transaction, for example, eavesdropping and saving 310 can occur, such by a malicious agent who eavesdrops and saves the transaction information, including stolen remittance request information 312 and a stolen correct MAC value 314 provided by (and stolen from) Alice 302. In this example, the malicious agent is an active attacker Mallory 316. The active attacker Mallory 316 can initiate a replay 318 using remittance request information 320 and a correct MAC value 322. During a replay attack 324, the active attacker Mallory 316 can repeatedly send a combination of previously eavesdropped and saved information and the MAC value.

Anti-replay-attack techniques, such as described in the present disclosure to guard against the replay attack 324, are generally more difficult to implement in decentralized systems as compared to centralized systems. Techniques described in the present disclosure can provide an improved high-performance, anti-replay technique that can, for example, quickly search on transaction information in a stable memory space.

Figure 4:
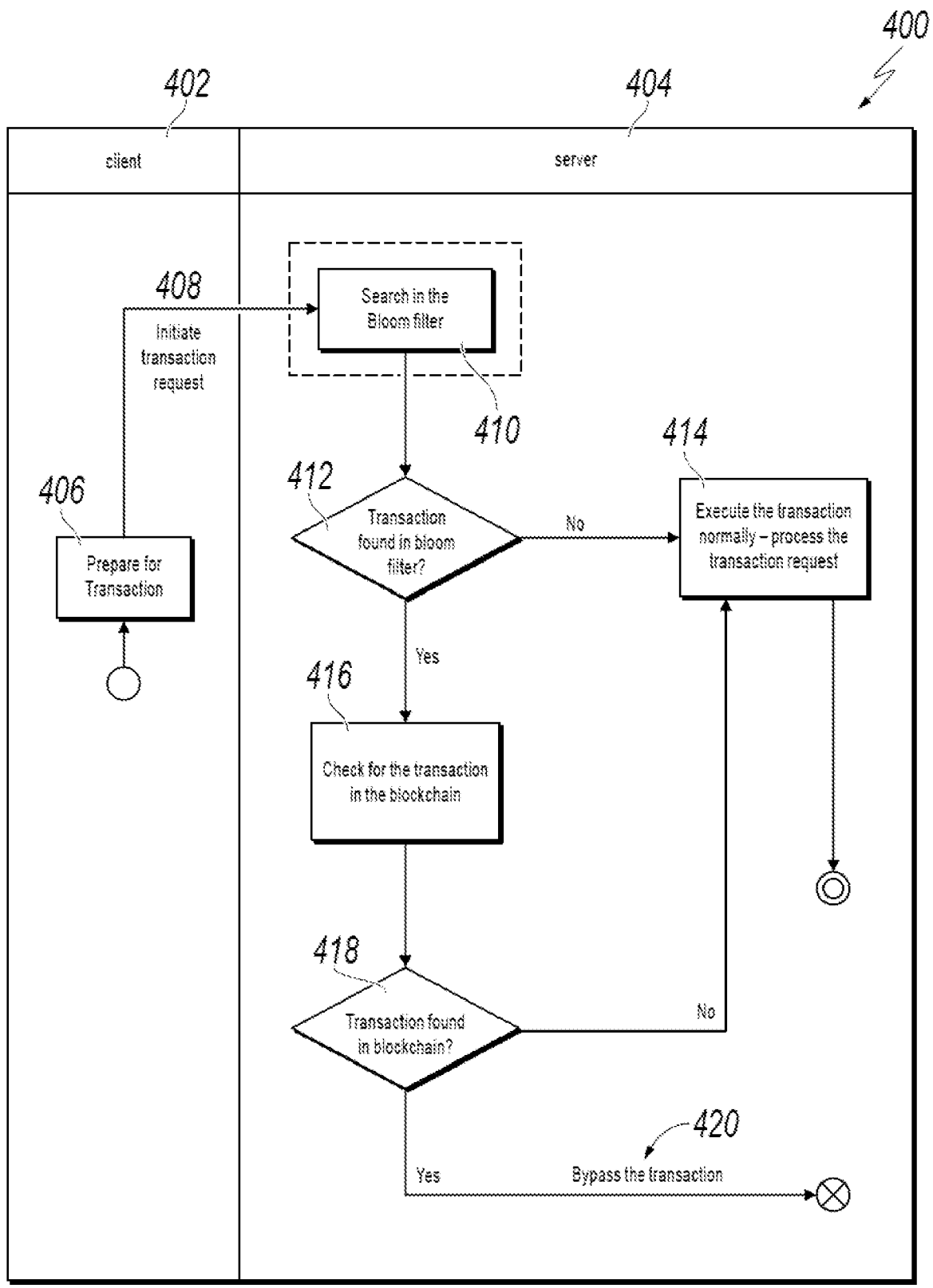
FIG. 4 is a block diagram showing an example of a conventional system for detecting replay attacks in accordance with embodiments of this specification.

FIG. 4 is a block diagram showing an example of a conventional system 400 for detecting replay attacks in accordance with embodiments of this specification. The conventional system 400 includes a client 402 and a server 404.

At 406, the client 402 prepares for the transaction. From 406, the flow proceeds to 408.

At 408, a transaction request 408 is initiated by the client 402. From 408, the flow proceeds to 410.

At 410, the server 404 performs a search in the Bloom filter for the transaction.

At 412, a determination is made whether the transaction is found in the Bloom filter. If the transaction is not found in bloom filter, the flow proceeds to 414 where the transaction is executed normally, and the transaction request is processed. However, if the transaction is found in the Bloom filter, then the flow proceeds 416, where a check is performed for the transaction in the blockchain.

At 418, a determination is made whether the transaction is found in the blockchain. If the transaction is not found in the blockchain, then the flow proceeds to 414, where the transaction is executed normally and the transaction request is processed. However, if the transaction is found in the blockchain, then the flow process to 420, where the transaction is bypassed.

For a system such as the conventional system 400 to operate correctly, memory that contains transaction information (for example, a tx_hash of a processed transaction) is typically sized to be as large as possible. For example, memory can be sized proportionally to a size of transaction information and a number of transactions. However, techniques used in the present disclosure can consider and exploit patterns of typical distribution times of typical playbacks. For example, time windows that include a normal transaction and also include attempted replayed transactions are generally short. As a result, replay attempts that are associated with network retransmissions combined with Transmission Control Protocol (TCP) protocols can be ignored after five minutes have elapsed from the time a normal transaction takes place.

Figure 5:
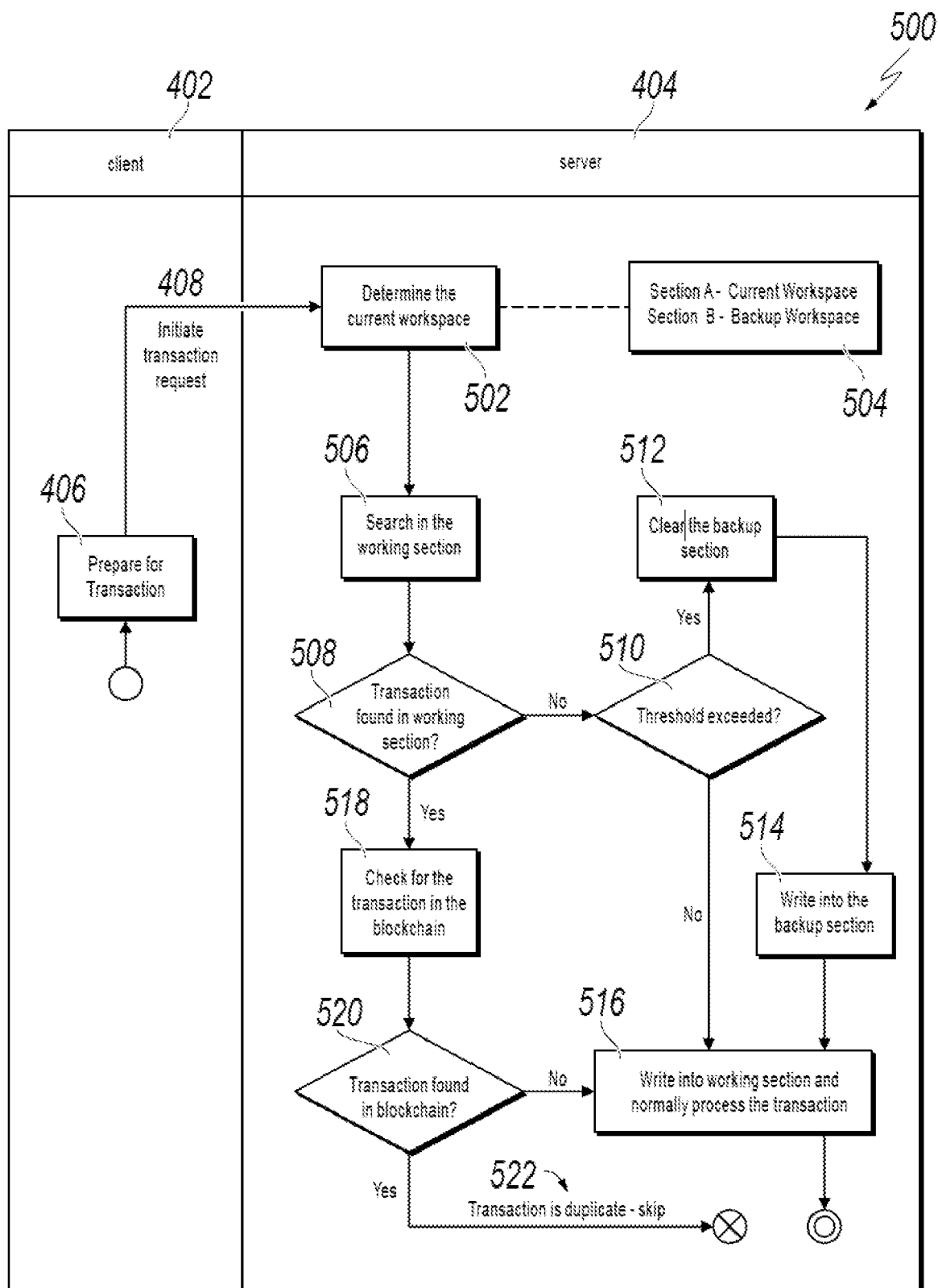
FIG. 5 is a block diagram showing an example of a system for detecting replay attacks in accordance with embodiments of this specification.

FIG. 5 is a block diagram showing an example of a system 500 for detecting replay attacks in accordance with embodiments of this specification. While the system 500 includes components that are similar to components in the system 400, it should be noted that the system 500 includes optimizations over the system 400. For example, in some embodiments, the optimizations can accelerate identification of replay attacks. The system 500 can be used, for example, to perform a re-find of a transaction, such as after a search for the transaction using the Bloom filter.

Processing within the system 500 can begin in the same way as the conventional system 400. For example, at 406, the client 402 prepares for the transaction.

At 408, a transaction request 408 is initiated by the client 402. From 402, the flow proceeds to 502.

At 502, the current workspace 504 is determined. For example, the current workspace 504 can be Section A, while Section B can serve as the backup workspace, at least initially in the current example. From 502, the flow proceeds to 506.

At 506, a search for the transaction is performed in the working section. From 506 the flow proceeds to 508.

At 508, a determination is made whether the transaction is found in working section. If the transaction is not found in the working section, then, at 510, a determination is made whether a threshold is exceeded for initiating switching of the sections. A threshold can exist, for example, when the working section reaches a per-determined percentage (for example, 95%) of capacity.

If, at 510, the threshold is determined to be exceeded, then the backup section is cleared at 512 in preparation of making the backup section the new working section. From 512, the flow proceeds to 514.

At 514, the transaction information is written into the backup section. From 514, the flow proceeds to 516.

Writing in both of the sections of memory can be done during an overlapping period in which the transaction information is written in both places. The redundancy of written information can be used to populate the backup section with the most recent transactions until a switch-over is performed. At switch-over time, the backup section becomes the new working section, and transaction information is written only to the new working section.

At 516, the transaction information is written into the current working section, and the transaction is processed normally.

If, at 508, the determination is that the transaction is found in working section, then the flow proceeds to 518 where a check for the transaction in the blockchain is performed.

At 520, a determination is made whether the transaction is found in the blockchain.

At 522, if, at 520 it is determined that the transaction is found in the blockchain, then the transaction is considered to be a duplicate transaction, and, at 522, the transaction is skipped. Otherwise, at 516, the transaction information is written into the current working section, and the transaction is processed normally.

In some embodiments, the system 500 operates successfully and efficiently because memory space of the system 500 can be divided into equal parts (for example, Section A and Section B), that are alternately used for performing a re-find operation. The memory space can store transaction information (such as, transaction IDs) that can be used for the re-find operation. At any given time, only one of the sections serves as the working section of the memory, and the other section is a backup section of the memory. Searches that are performed at 508 during the re-find operation are performed on only half of the memory, specifically the working section. In the current example, Section A is initially the working section of memory, and Section B is initially the backup section of the memory. When Section A is the working section, then the re-find operations searches only Section A.

Over time, the memory space in Section A can fill up with transaction information. At some point in time, such as when a threshold condition is reached, it becomes necessary to prepare for a time when a switch-over of sections of memory will occur. Upon completion of a switch-over, Section A (initially the working section in the current example) will cease to be the working section and will become the backup section. At the same time, Section B will cease to be the backup section and will become the working section.

In preparation for the switch-over, an overlap period can exist during which transaction information that is written to the working section can be redundantly written to the backup section. For example, at a time that the switch-over is to occur, the transaction information can be written to both Section A and Section B. This occurs, for example, while Section A is still the working section and Section B (currently the backup section) is soon to become the working section. At least a small number of transactions' transaction information is needed for Section B so that when Section A is no longer the working section, a useful number of transactions will have had their transaction information written to Section B (for example, for searching in re-find operations).

During normal operation, the workflow of the system 500 bypasses steps 512 and 514. However, during a switch-over (after the threshold is determined to be exceeded at 510), steps 512 and 514 are performed. At the time of the switch-over, or more specifically at the beginning of the overlapping period, the backup section is cleared to prepare for writing transaction information.

In some embodiments, various thresholds can be used at 510. For example, in addition to a threshold for percentage of used workspace (for example, 95%), a switch-over can be initiated when a misjudgment rate of the working section is greater than 10%.

Advantages can include one or more of the following. First, memory overhead for anti-replay determinations can remain stable during system operations. Second, splitting the memory into two identical zones (working and backup sections) can improve the efficiency of the anti-replay algorithm. For example, hashmap algorithms may suffer collisions between used space, and the Bloom filter can create false positive probabilities that are proportional to a sum of allocation space plus historical data. Third, a double write mechanism during a switch-over can provide a seamless switching between the working and backup sections.

Figure 6:
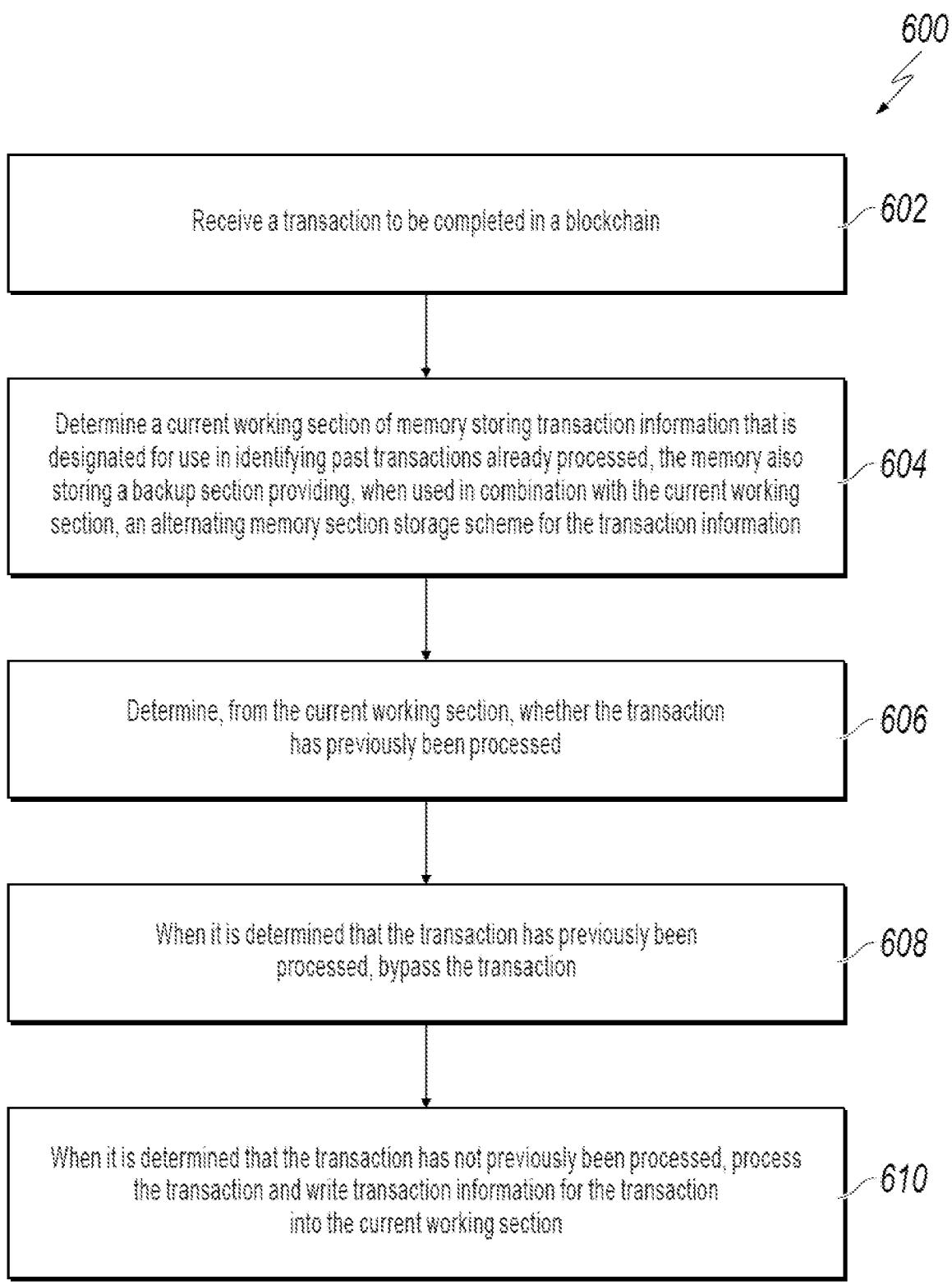
FIG. 6 is a flowchart depicting an example of a method for detecting and disabling replay attacks.

FIG. 6 is a flowchart depicting an example of a method 600 for detecting and disabling replay attacks. For convenience, the method 600 will be described as being performed by a system of one or more computers, located in one or more locations, and programmed appropriately in accordance with this specification. For example, a replay attack detection and disabling system (such as, the system 500 of FIG. 5), appropriately programmed, can perform the method 600.

At 602, a transaction to be completed in a blockchain is received. For example, the client 402 can initiate the transaction request 408 which can be received by the server 404. In some embodiments, the transaction request can be a transaction can be sent within a blockchain. From 602, method 600 proceeds to 604.

At 604, a current working section of memory storing transaction information is determined that is designated for use in identifying past transactions already processed. The memory also stores a backup section that, when used in combination with the current working section, provides an alternating memory section storage scheme for the transaction information. For example, the system 500 (for example, at 502) can determine if the current working section of memory is Section A or Section B. From 604, method 600 proceeds to 606.

At 606, a determination is made, using the current working section, whether the transaction has previously been processed. For example, the system 500 can access (for example, at 506) transaction information in Section A and determine (for example, at 508) that the transaction has already been processed. In some embodiments, a database flag or other indicator can indicate which of the sections in memory is the current working section, for example, Section A or Section B. From 606, method 600 proceeds to 608.

At 608, when it is determined that the transaction has previously been processed, the transaction is bypassed. As an example, the system 500 (for example, at 516) can process the transaction normally. Further, the system 500 can write the transaction information into the current working section. From 608, method 600 proceeds to 610.

At 610, when it is determined that the transaction has not previously been processed, the transaction is processed and transaction information for the transaction is written into the current working section. As an example, the system 500 can bypass the transaction at 516, writing the transaction information to Section A, for example, and processing the transaction normally. After 610, method 600 can stop.

In some embodiments, the method 600 further includes steps for performing a switch-over (or a swap) of the current working section and the backup section. For example, the system 500 can determine whether a threshold condition is met for initiating a switch-over between the current working section and the backup section. In some embodiments, the threshold condition is an indication that a pre-determined percentage (for example, 95%) of the current working section's storage capacity has been used. In some embodiments, the threshold condition is an indication that a misjudgment rate of the current working section is greater than a pre-determined rate (for example, 10%). When it is determined that the threshold condition is met, the switch-over is initiated, including starting an overlapping period in which the transaction information is written to both the current working section and to the backup section. When the overlapping period is initiated, the backup section is cleared. During the overlapping period, transaction information is written to the backup section.

In some embodiments, method 600 can further includes steps that occur at the end of the overlapping period. For example, the system 500 can determine that an end of the overlapping period has been reached. At that time, the system 500 can cease the writing of the transaction information to the current working section, and the system 500 can designate the backup section as the current working section.

In some embodiments, the method 600 further includes steps for determining if the transaction is in the blockchain. For example, the system 500 can search the blockchain to determine if the transaction is in the blockchain. Upon determining that the transaction is in the blockchain, the system 500 can bypass the transaction.

In some embodiments, the method 600 further includes steps for using a Bloom filter for determining a probability that the transaction already exists. For example, prior to determining whether the transaction has previously been processed, the system 500 can determine, using a Bloom filter, a probability that the transaction has previously been processed. A high probability can indicate that the transaction has been previously processed.

Figure 7:
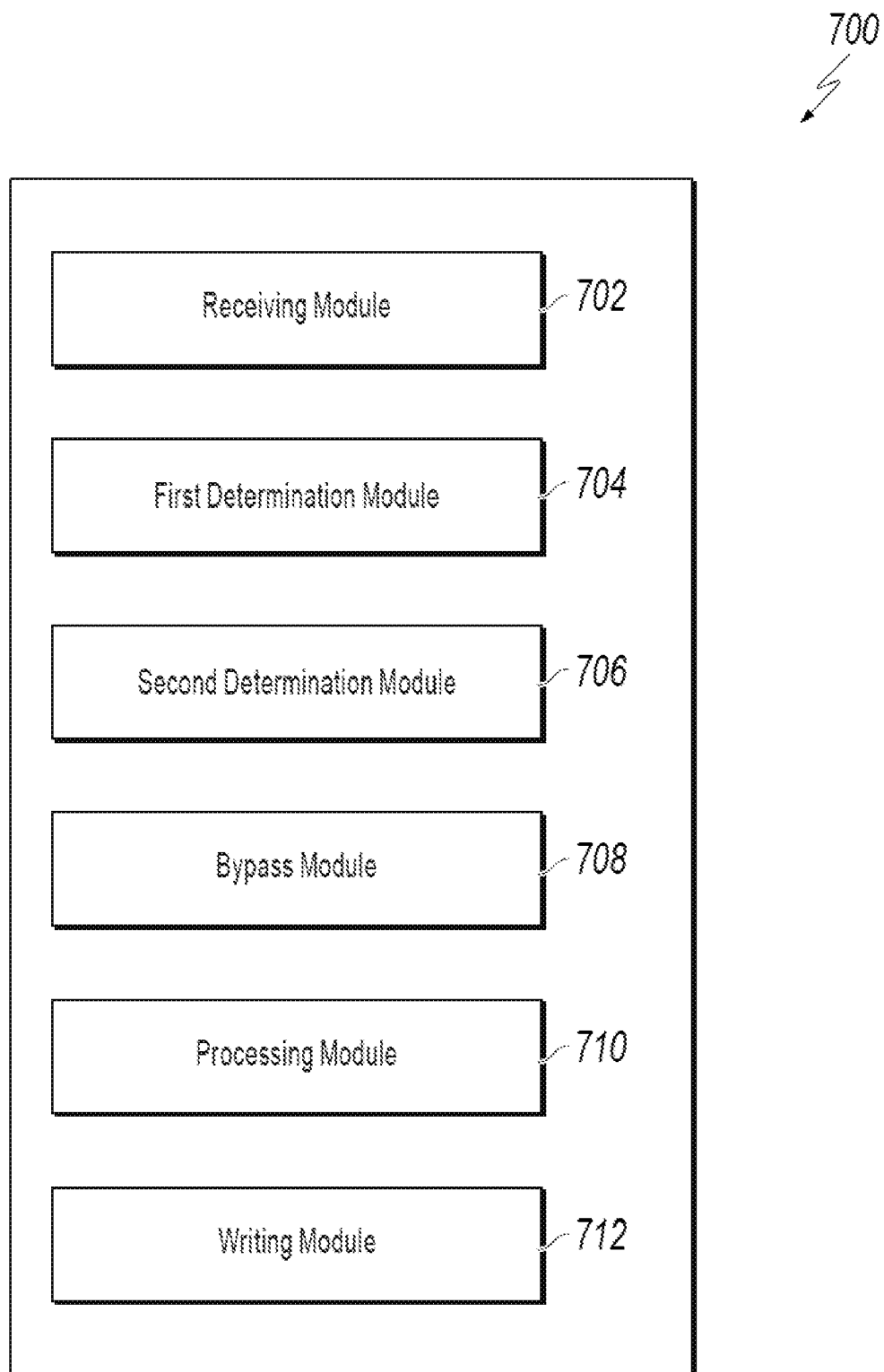
FIG. 7 depicts examples of modules of an apparatus in accordance with embodiments of this specification.

FIG. 7 depicts examples of modules of an apparatus 700 in accordance with embodiments of this specification.

The apparatus 700 can be an example of an embodiment of an apparatus for detecting and disabling replay attacks. The apparatus 700 can correspond to the embodiments described above, and the apparatus 700 includes the following: a receiving module 702 for receiving a transaction to be completed in a blockchain; a first determination module 704 for determining a current working section of memory storing transaction information that is designated for use in identifying past transactions already processed, the memory also storing a backup section providing, when used in combination with the current working section, an alternating memory section storage scheme for the transaction information; a second determination module 706 for determining, from the current working section, whether the transaction has previously been processed; a bypass module 708 for when it is determined that the transaction has previously been processed, bypassing the transaction; and when it is determined that the transaction has not previously been processed: a processing module 710 for processing the transaction; and a writing module 712 for writing transaction information for the transaction into the current working section.

In an optional embodiment, the apparatus 700 further includes a determining module (for example, the first determination module 704, the second determination module 706, or another determination module) for determining whether a threshold condition is met for initiating a switch-over between the current working section and the backup section.

In an optional embodiment, the apparatus 700 further includes, when it is determined that the threshold condition is met: an initiation module for initiating the switch-over including starting an overlapping period in which the transaction information is written to the current working section and to the backup section; a clearing module for clearing the backup section; and a writing module (for example, the writing module 712 or another writing module) for writing the transaction information to the backup section.

In an optional embodiment, the apparatus 700 further includes a determination module (for example, the first determination module 704, the second determination module 706, or another determination module) for determining that an end of the overlapping period has been reached; a ceasing module for ceasing the writing of the transaction information to the current working section; and a designation module for designating the backup section as the current working section.

In an optional embodiment, the threshold condition is an indication that a pre-determined percentage of the current working section's storage capacity has been used or an indication that a misjudgment rate of the current working section is greater than a pre-determined rate.

In an optional embodiment, the apparatus 700 further includes a determination module (for example, the first determination module 704, the second determination module 706, or another determination module) for determining if the transaction is in the blockchain; and a bypass module (for example, bypass module 710 or another bypass module) for bypassing the transaction upon determining that the transaction is in the blockchain.

In an optional embodiment, the apparatus 700 further includes a determination module (for example, the first determination module 704, the second determination module 706, or another determination module) for determining, prior to determining whether the transaction has previously been processed and using a Bloom filter, a probability that the transaction has previously been processed.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 7, it can be interpreted as illustrating an internal functional module and a structure of a replay attacks detection and disabling apparatus. An execution body in essence can be an electronic device, and the electronic device includes the following: one or more processors; and a memory configured to store an executable instruction of the one or more processors.

The one or more processors are configured to receive a transaction to be completed in a blockchain; determine a current working section of memory storing transaction information that is designated for use in identifying past transactions already processed, the memory also storing a backup section providing, when used in combination with the current working section, an alternating memory section storage scheme for the transaction information; determine, from the current working section, whether the transaction has previously been processed; when it is determined that the transaction has previously been processed, bypass the transaction; and when it is determined that the transaction has not previously been processed: process the transaction; and write transaction information for the transaction into the current working section.

The techniques described in this specification can produce one or more technical effects. In some embodiments, memory for storing transaction information is divided into a current working section and a backup section. In other embodiments, when a search is performed in memory, only the half of the memory that includes the current working section needs to be searched, which saves computing resources and increases overall search time. In still other embodiments, when a threshold condition indicates that the sections of memory are to be switched (that is, a switch-over between the current working section and the backup section), the backup section becomes the new current working section, and the section that had been the current working section is designated as the new backup section.

Described embodiments of the subject matter can include one or more features, alone or in combination.

For example, in a first embodiment, a computer-implemented method for detecting and disabling replay attacks, the method comprising: receiving a transaction to be completed in a blockchain; determining a current working section of memory storing transaction information that is designated for use in identifying past transactions already processed, the memory also storing a backup section providing, when used in combination with the current working section, an alternating memory section storage scheme for the transaction information; determining, from the current working section, whether the transaction has previously been processed; when it is determined that the transaction has previously been processed, bypassing the transaction; and when it is determined that the transaction has not previously been processed: processing the transaction; and writing transaction information for the transaction into the current working section. The foregoing and other described embodiments can each, optionally, include one or more of the following features:

A first feature, combinable with any of the following features, further comprising determining whether a threshold condition is met for initiating a switch-over between the current working section and the backup section.

A second feature, combinable with any of the previous or following features, further comprising: when it is determined that the threshold condition is met: initiating the switch-over including starting an overlapping period in which the transaction information is written to the current working section and to the backup section; clearing the backup section; and writing the transaction information to the backup section.

A third feature, combinable with any of the previous or following features, further comprising: determining that an end of the overlapping period has been reached; ceasing the writing of the transaction information to the current working section; and designating the backup section as the current working section.

A fourth feature, combinable with any of the previous or following features, specifies that the threshold condition is an indication that a pre-determined percentage of the current working section's storage capacity has been used.

A fifth feature, combinable with any of the previous or following features, specifies that the threshold condition is an indication that a misjudgment rate of the current working section is greater than a pre-determined rate.

A sixth feature, combinable with any of the previous or following features, further comprising: determining if the transaction is in the blockchain; and upon determining that the transaction is in the blockchain, bypassing the transaction.

A seventh feature, combinable with any of the previous or following features, further comprising: prior to determining whether the transaction has previously been processed, determining, using a Bloom filter, a probability that the transaction has previously been processed.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for detecting and disabling replay attacks, the method comprising:
   receiving a transaction to be completed in a blockchain;
   determining a current working section of a memory storing transaction information that is designated for use in identifying past transactions already processed, the memory also storing a backup section providing, when used in combination with the current working section, an alternating memory section storage scheme for the transaction information;
   determining, from the current working section, whether the transaction has previously been processed; and
   in response to determining that the transaction has not previously been processed:
      determining whether a threshold condition is met for initiating a switch-over between the current working section and the backup section, wherein the threshold condition comprises an indication that a misjudgment rate of the current working section is greater than a pre-determined rate;
      in response to determining that the threshold condition is met, initiating the switch-over including starting an overlapping period in which additional transaction information is written to the current working section and to the backup section;
      processing the transaction; and
      writing particular transaction information for the transaction into the current working section.

2. The method of claim 1, further comprising:
   determining that an end of the overlapping period has been reached;
   ceasing the writing of the transaction information to the current working section; and
   designating the backup section as the current working section.

3. The method of claim 1, wherein the threshold condition comprises an additional indication that a pre-determined percentage of storage capacity of the current working section has been used.

4. The method of claim 1, further comprising: determining if the transaction is in the blockchain; and
   upon determining that the transaction is in the blockchain, bypassing the transaction.

5. The method of claim 1, further comprising:
   prior to determining whether the transaction has previously been processed, determining, using a Bloom filter, a probability that the transaction has previously been processed.

6. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations for detecting and disabling replay attacks, the operations comprising:
      receiving a transaction to be completed in a blockchain;
      determining a current working section of a memory storing transaction information that is designated for use in identifying past transactions already processed, the memory also storing a backup section providing, when used in combination with the current working section, an alternating memory section storage scheme for the transaction information;
      determining, from the current working section, whether the transaction has previously been processed; and
      in response to determining that the transaction has not previously been processed:
         determining whether a threshold condition is met for initiating a switch-over between the current working section and the backup section, wherein the threshold condition comprises an indication that a misjudgment rate of the current working section is greater than a pre-determined rate;
         in response to determining that the threshold condition is met, initiating the switch-over including starting an overlapping period in which additional transaction information is written to the current working section and to the backup section;
         processing the transaction; and
         writing particular transaction information for the transaction into the current working section.

7. The system of claim 6, the operations further comprising:
   determining that an end of the overlapping period has been reached;
   ceasing the writing of the transaction information to the current working section; and
   designating the backup section as the current working section.

8. The system of claim 6, wherein the threshold condition comprises an additional indication that a pre-determined percentage of storage capacity of the current working section has been used.

9. The system of claim 6, the operations further comprising:
   determining if the transaction is in the blockchain; and
   upon determining that the transaction is in the blockchain, bypassing the transaction.

10. The system of claim 6, the operations further comprising:
    prior to determining whether the transaction has previously been processed, determining, using a Bloom filter, a probability that the transaction has previously been processed.

11. A non-transitory, computer-readable storage medium storing one or more instructions executable by a computer system to perform operations for detecting and disabling replay attacks, the operations comprising:
    receiving a transaction to be completed in a blockchain;
    determining a current working section of a memory storing transaction information that is designated for use in identifying past transactions already processed, the memory also storing a backup section providing, when used in combination with the current working section, an alternating memory section storage scheme for the transaction information;
    determining, from the current working section, whether the transaction has previously been processed; and
    in response to determining that the transaction has not previously been processed:
       determining whether a threshold condition is met for initiating a switch-over between the current working section and the backup section, wherein the threshold condition comprises an indication that a misjudgment rate of the current working section is greater than a pre-determined rate;

in response to determining that the threshold condition is met, initiating the switch-over including starting an overlapping period in which additional transaction information is written to the current working section and to the backup section;

processing the transaction; and writing particular transaction information for the transaction into the current working section.

12. The non-transitory, computer-readable storage medium of claim 11, the operations further comprising:

determining that an end of the overlapping period has been reached;

ceasing the writing of the transaction information to the current working section; and designating the backup section as the current working section.

13. The non-transitory, computer-readable storage medium of claim 11, wherein the threshold condition comprises an additional indication that a pre-determined percentage of storage capacity of the current working section has been used.

14. The non-transitory, computer-readable storage medium of claim 11, the operations further comprising:

determining if the transaction is in the blockchain; and upon determining that the transaction is in the blockchain, bypassing the transaction.

15. The non-transitory, computer-readable storage medium of claim 11, the operations further comprising:

prior to determining whether the transaction has previously been processed, determining, using a Bloom filter, a probability that the transaction has previously been processed.

* * * * *